L. RICE.
NUT LOCK.
APPLICATION FILED JULY 13, 1910.
1,027,001.
Patented May 21, 1912.
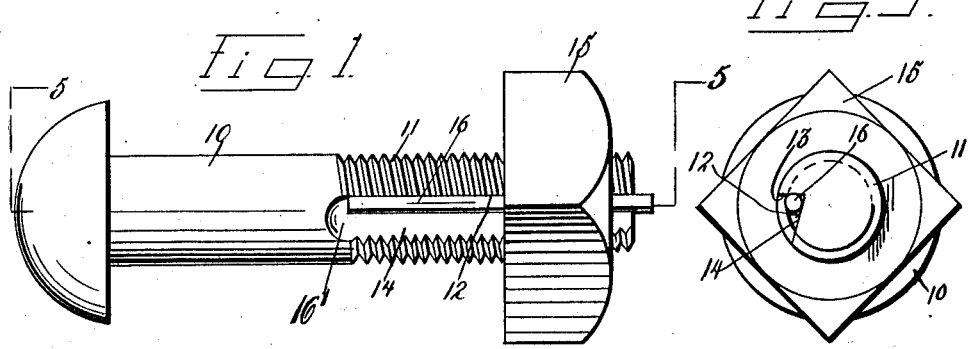
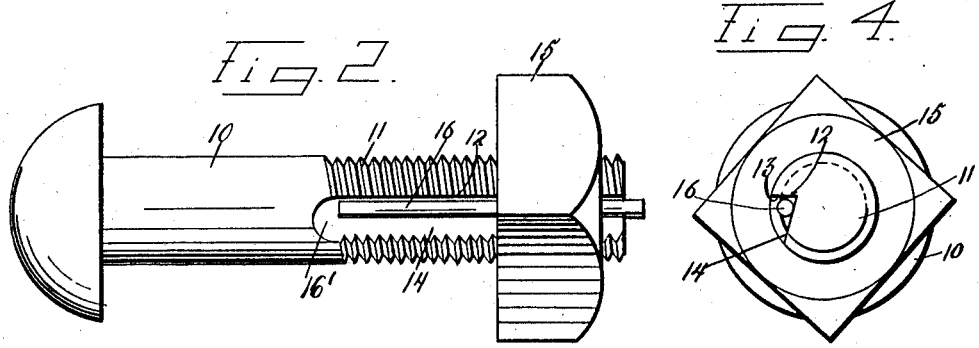
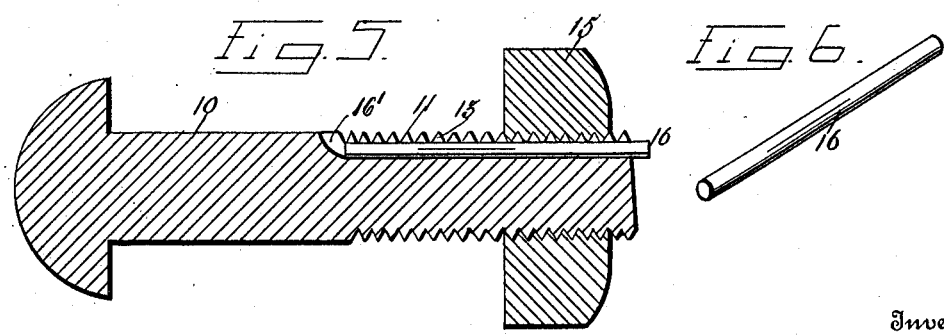
Inventor
LEANDER RICE.
Witnesses
J. E. Strobel
Francis Boyle
By
Attorneys

UNITED STATES PATENT OFFICE.

LEANDER RICE, OF KAHLOTUS, WASHINGTON.

NUT-LOCK.

1,027,001.  Specification of Letters Patent.  Patented May 21, 1912.

Application filed July 13, 1910. Serial No. 571,792.

*To all whom it may concern:*

Be it known that I, LEANDER RICE, a citizen of the United States, residing at Kahlotus, in the county of Franklin, State of Washington, have invented certain new and useful Improvements in Nut-Locks; and I do hereby declare the following to be a full, clear, and exact description of the invention, such as will enable others skilled in the art to which it appertains to make and use the same.

This invention relates to nut locks and has for an object to provide a nut lock that will permit of the nut being manually backed off without the removal of the nut lock or requiring any special tools for this purpose.

The invention contemplates providing a locking pin that will roll in a slot in the bolt and when rolled in one direction by the advancing nut will permit of the nut being readily screwed home but when rolled in the opposite direction by the retraction of the nut will be cammed into frictional engagement with the threads of the nut and positively prevent a further retraction of the nut.

With the above and other ends in view, the invention consists of the novel details of construction and combination of parts hereinafter fully described and claimed, it being understood that various modifications may be made in the minor details of construction within the scope of the appended claim.

In the accompanying drawings forming part of this specification: Figure 1 is a side elevation of a bolt and nut showing the locking pin in position for permitting the nut to be screwed home. Fig. 2 is a side elevation of the bolt and nut showing the locking pin in position for locking the nut against retraction. Fig. 3 is an end elevation of the nut and bolt shown in Fig. 1. Fig. 4 is an end elevation of the nut and bolt shown in Fig. 2. Fig. 5 is a longitudinal sectional view through the line 5—5, Fig. 1. Fig. 6 is a detail perspective view of the locking pin.

The reference character 10 designates a bolt having its threaded end 11 provided in its side with a longitudinal rabbet 12, one wall 13 of this rabbet extending radially of the bolt and the other wall 14 of this rabbet being disposed in a plane that intersects the plane of the wall 13 in less than a right angle. This rabbet is formed deeper than the valleys between the threads of the bolt but not deep enough to weaken the bolt.

A nut 15 of the usual kind threads on the threaded end 11 of the bolt and is locked in position thereupon by a novel locking pin 16 which will now be described.

The locking pin is preferably formed of a single length of round material and is preferably tempered so as not to readily be cut by the interior threads of the nut 15. The diameter of this pin is slightly greater than that portion of the radial wall 13 which lies below the valleys of the bolt threads, this construction permitting of the pin when inserted in the rabbet 11 rolling up against the radial wall so that the threads of the nut may pass readily over the pin and permit of the nut being advanced home upon the bolt. It is now evident that since the wall 14 of the rabbet opposite to the radial wall is inclined to the radial wall at an angle less than a right angle, that this wall forms a cam surface which when the locking pin rolls away from the radial wall will cam upward the locking pin into abutting contact with the interior threads of the nut and positively prevent the retraction of the nut upon the bolt. It will be noted that since the diameter of the locking pin is slightly greater than that portion of the radial wall lying below the valleys of the threads that the periphery of the locking pin will be in close contact with the threads of the nut when the locking pin is rolled up against the radial wall so that when the nut is retracted, the threads will operate to roll the locking pin upon the cam wall of the rabbet until the cam wall performs its function as above described.

In applying the bolt to a support of any kind, the locking pin is inserted in the rabbet in the bolt and the nut then advanced home as above described and when its final position is reached is then given a slight turn rearward in order to cause the cam wall of the rabbet to force the locking pin into the nut threads and lock the nut in position. It is clear that when it becomes necessary to remove the nut that the locking pin may be manually pushed up against the radial wall of the rabbet and held in this position by a pin or similar tool until the nut is retracted from the bolt. Thus it will be seen that no special tools are required in removing the nut from the bolt and that the nut may be removed without removing the locking pin or without injury to either the bolt or locking pin or nut, so that these parts can be used continuously without renewal. As a further means for quickening the action of the locking pin, the end of the rabbet is rounded upwardly as shown at 16' so that a curvilinear cam surface is presented which engages the end of the pin when the latter is driven to its full length into the rabbet and cams the pin outward. It is thus evident that when the nut has been advanced to its final position upon the bolt, the locking pin may be applied upon its outer end and driven snugly against the cam face 16' so that the locking pin will be cammed into close engagement with the threads of the bolt and thus the threads will take hold immediately so that it requires but a slight twist of the nut to roll the locking pin sufficiently to enable the cam wall of the rabbet to perform its function.

What is claimed is:

A nut lock comprising a threaded bolt, a nut on said bolt, said bolt having a longitudinal recess, said recess having side walls at about right angles to each other and terminating in an end wall which merges gradually into the surface of the bolt and forms a cam surface, a pin seated in said recess having a lateral play limited by said side walls, the inner end of said pin bearing upon said cam surface and being cammed thereby into binding contact with said nut.

In testimony whereof, I affix my signature, in presence of two witnesses.

LEANDER RICE.

Witnesses:
M. L. WESTON,
CHAS. JOHNSTON.

Copies of this patent may be obtained for five cents each, by addressing the "Commissioner of Patents, Washington, D. C."